2,945,057
PREPARATION OF METHYL METHACRYLATE

Edgar L. McDaniel and Howard S. Young, Kingsport, Tenn., assignors to Eastman Kodak Company, Rochester, N.Y., a corporation of New Jersey No Drawing. Filed Apr. 1, 1959, Ser. No. 803,345

19 Claims. (Cl. 260—486)

This invention relates to the preparation of methyl methacrylate.

Methyl methacrylate is a valuable commercial chemical as it can be readily polymerized to produce useful polymeric materials. Methyl methacrylate has been previously prepared by the dehydrogenation of methyl isobutyrate by various solid catalyst materials. However, many dehydrogenation catalyst materials result in particularly low conversions and yields of methyl isobutyrate to methyl methacrylate. Such catalysts as iodine-oxygen mixtures have also been suggested as a dehydrogenation catalyst for methyl isobutyrate. However, in actual practice, the loss of iodine after the completion of the process renders the use of this catalyst unattractive commercially.

It is an object of this invention to provide a new and useful method for producing methyl methacrylate from methyl isobutyrate.

It is another object of this invention to provide a novel dehydrogenation catalyst for dehydrogenating methyl isobutyrate.

It is another object of this invention to prepare methyl methacrylate by a new process with a dehydrogenation catalyst that has a long catalyst life.

It is likewise an object of this invention to convert methyl isobutyrate to methyl methacrylate by an improved method with a minimum of side reactions.

It is also an object of this invention to provide a new catalyst for dehydrogenating methyl isobutyrate, the catalyst being in a commercially desirable form suitable for use in fixed and fluidized catalyst beds.

It is an additional object of this invention to provide a new catalyst for dehydrogenating methyl isobutyrate to methyl methacrylate that can be employed in the presence of water.

These and other objects of the invention are accomplished by dehydrogenating methyl isobutyrate to methyl methacrylate in the present of a catalyst material composed of an activated alumina at elevated temperatures. The reaction of the present process can be represented as follows:

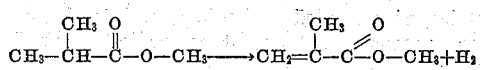

Any of the well-known activated aluminas can be utilized in the present process including such well known activated aluminas as gamma alumina, chi alumina, eta alumina, kappa alumina, theta alumina, alpha alumina monohydrate, and related activated aluminas, or admixtures thereof. Such aluminas are adsorptive, calcined aluminas, and their methods of preparation are well known in the art. The activated aluminas employed in the present process have characteristic X-ray patterns. Such aluminas are porous materials and have relatively large surface areas, usually at least 50 and generally 50–250 square meters per gram, the surface area varying with the type of alumina and its method of preparation.

"Bayer process activated alumina" is a typical alumina material that can be employed in the present catalyst system. This material consists essentially of a mixture of alpha alumina monohydrate, chi alumina and gamma alumina. The term "Bayer process alumina" is commonly used to describe a material produced in large quantities as an intermediate in the production of aluminum metal from bauxite, this material being $$Al_2O_3 \cdot 3H_2O$$

and is known as alpha alumina trihydrate. By a controlled calcination of this alpha alumina trihydrate, the transition alumina material referred to above as "Bayer process activated alumina" is obtained.

Gel-type activated alumina can also be used in the present process. Such materials are prepared by a controlled calcination of a gelatinous alpha alumina monohydrate. Generally such an alumina has smaller pores and higher surface area than the "Bayer process activated alumina" and is composed largely of alpha alumina monohydrate. This form of alumina, on further calcination, can be converted to gamma alumina which also can be used in the present process.

Eta alumina, which is formed, usually in admixture with gamma alumina, on calcination of beta alumina trihydrate can also be utilized. Beta alumina trihydrate can be prepared by the action of water on amalgamated aluminum.

Another alumina that can be suitably employed is activated bauxite, such as the commercial material known as "Porocel." Bauxite usually refers to various ores consisting of fairly high purity hydrated aluminas. A calcination of bauxite results in an activated alumina containing gamma and other forms of activated alumina.

The present dehydrogenation reaction is effected at elevated temperatures. Temperatures in the range of 400°–800° C. can be employed, although temperatures in the range of 500°–650° C. are preferably used. At such temperatures, the methyl isobutyrate starting material is in a gaseous or vapor phase.

We have found that by carrying out the dehydrogenation of methyl isobutyrate in a vapor or gaseous phase wherein the partial pressure of the gaseous methyl isobutyrate in the reaction vessel is less than atmospheric pressure (i.e. less than 760 mm. of mercury), best yields of methyl methacrylate result. In addition, the use of reduced pressures tends to produce a methyl methacrylate product having improved purity. In accordance with the invention, the partial pressure of the gaseous methyl isobutyrate can be reduced by employing a reduced pressure or vacuum in the reaction vessel. Such vacuums can be produced in the reaction vessel by any of the well-known vacuum pumps, vacuum jets, and related apparatus. Also, a substantially inert diluent gas such as nitrogen, helium, argon, carbon dioxide, steam, or the like, in admixture with the gaseous methyl isobutyrate, can be used to reduce the partial pressure of the gaseous methyl isobutyrate. When employing a diluent gas to reduce the partial pressure of the gaseous methyl isobutyrate, the sum of the partial pressures of the gaseous methyl isobutyrate and the diluent gas can conveniently equal atmospheric pressure, although higher or lower total pressures can be employed and the partial pressure of the gaseous isobutyrate component still maintained at a subatmospheric pressure. An example of an admixture of gaseous methyl isobutyrate and an inert gas such as nitrogen, the nitrogen being used to reduce the partial pressure of the methyl isobutyrate, can be represented as follows in terms of Dalton's law of partial pressure:

$$P_{total} = P_{nitrogen} + P_{methyl\ isobutyrate}$$

Partial pressures of methyl isobutyrate less than atmospheric pressure are desirable, with pressures in the range of about 1–500 mm. of mercury being more usually used, and with pressures in the range of about 25–250 mm. of mercury being preferably utilized. Atmospheric pressure or even elevated pressures are operable in the subject dehydrogenation reaction. However, such reaction conditions require longer contact times, result in lower yields and tend to cause the formation of unwanted by products, and thus, the above-described reduced pressures are preferably employed.

As described above, steam can be employed as a gaseous diluent in the subject dehydrogenation reaction effected in the presence of activated alumina to reduce the partial pressure of the methyl isobutyrate reactant to increase the yield of methyl methacrylate. As steam is an inexpensive diluent gas and can be readily separated from the present organic reaction product, such a feature is a commercially desirable feature of the present process. Further, it was surprising to find that steam can be employed in the present process as several investigators in the catalyst field have reported that water has a poisoning effect on the activity of alumina catalysts. With respect to the adverse affect of water on alumina catalysts, reference is made to the following publications: Holm and Blue, Ind. Eng. Chem. 43, 501 (1951) and Ind. Eng. Chem. 44, 107 (1952); Hindin and Weller, "Advances in Catalysis," vol. IX, Academic Press, Inc., New York, N.Y., 1957, chapter 10; Burgin et al., as quoted by K. K. Kearby in "Catalysis," vol. III, P. H. Emmett, Editor, Reinhold Publishing Corp., New York, N.Y., 1955, chapter 10; and U.S. Patent No. 2,790,015. In addition, it would be expected that such esters as the starting material, methyl isobutyrate, or the reaction product, methyl methacrylate, would be hydrolyzed or decomposed in contact with steam under the stringent conditions employed in the present dehydrogenation reaction. However, the activated alumina catalysts of the invention are active in the presence of water, the conversions and yields being relatively high.

The present process is typically carried out by introducing the methyl isobutyrate into a reaction vessel containing the present catalyst. The methyl isobutyrate is usually fed into the reaction vessel at a liquid hourly space velocity of about .05–10 and preferably about .1–5, liquid hourly space velocity being the volume of liquid methyl isobutyrate feed material per volume of catalyst in the reaction vessel per hour. The normally liquid methyl isobutyrate may be converted to the gaseous phase by subjecting the material to elevated temperature before introduction into the reaction vessel. The contact time of the resulting gaseous methyl isobutyrate with the catalyst in the reaction vessel usually is about .05–10 seconds and preferably about .5–5 seconds, the contact time being the average length of time that the gaseous methyl isobutyrate is in contact with the catalyst. A substantial amount of the gaseous methyl isobutyrate is dehydrogenated to methyl methacrylate in the reaction vessel and thereafter condensed to the liquid state and collected. Methyl methacrylate and unreacted methyl isobutyrate typically comprise about 95–99% of the resulting collected condensate, this condensate being characterized as lacking in significant amounts of impurities and reaction by-products. The methyl methacrylate can be readily separated from the unreacted portions of the methyl isobutyrate by known separation methods such as distillation and solvent extraction.

The present alumina catalyst materials can be utilized for extended periods of time. However, after considerable use deposits of various materials including carbon occur on the catalyst as is the case with other catalyst materials. However, the present catalyst materials can be readily regenerated. For example, an alumina catalyst can be regenerated by burning at 500°–625° C. with a moderate stream of gas containing about 3% oxygen and 97% nitrogen or other inert gas (a gaseous hourly space velocity of 2300 being typical), to remove carbon and the like from the catalyst. Such a regeneration process for the present catalyst material is highly exothermic.

A freshly prepared or a freshly regenerated activated alumina catalyst is extremely reactive and even destructive in the present reaction. It was considered that activated aluminas, while being suitable for use in hydrocarbon chemistry, would not be suitable for preparing such relatively labile unsaturated esters as methyl methacrylate. However, we have unexpectedly found that the subject catalysts are not destructive but are rather specific in the dehydrogenation of methyl isobutyrate to methyl methacrylate when the catalyst has first been allowed to be exposed for a finite time to the conditions of the subject dehydrogenation reaction. Such an induction period is usually at least about 4 hours and often times 5 to 6 hours. After the induction period, the subject alumina catalyst can be effectively employed for extended periods of time in the present dehydrogenation reaction to give consistently high conversions of methyl isobutyrate to methyl methacrylate and yields of methyl methacrylate.

We have also found that the initial wild period of freshly prepared or regenerated activated alumina of the invention can be substantially reduced by employing certain metallic promoters in combination with the alumina. In addition, such promoters in many instances substantially increase the effectiveness of the alumina with respect to the degree of conversion of methyl isobutyrate to methyl methacrylate and to the yield of methyl methacrylate in the present process. Promoters comprising the following metals have been found to be effective in combination with activated aluminas in the present process: vanadium, molybdenum, titanium, zirconium, niobium (columbium), chromium, copper, zinc, cadmium, lead, manganese, antimony, bismuth, lithium, cerium, tungsten, palladium, silver and the alkaline earth metals, barium, calcium, strontium, and magnesium. Preferred promoters include oxides of vanadium, molybdenum and calcium. Such promoters are predominately in the form of an oxide or in elemental form on the alumina. If the promoter is initially incorporated on the alumina as an acetate or a nitrate, or some other salt, this compound is converted by calcination or during the present dehydrogenation reaction predominately to an oxide and in some instances in part to a carbonate or in part to its elemental form. Usually about .1–30% and preferably 1–15% promoting material based on the combined weight of the promoter and the alumina is employed in the present instance. Mixtures of more than one of the metallic promoters can be effectively employed in combination with the alumina. Typical of such mixtures are catalysts composed of 4–20% of a copper oxide, 0.2–3% of a chromium oxide and 1–15% of an oxide of calcium, barium or strontium based on the combined weight of the promoter and the alumina. With the described metallic promoter materials, the induction period or period of destructive activity of freshly prepared or freshly regenerated transition aluminas is substantially reduced to induction periods from about 30 minutes or less to about 2 hours.

The invention is further illustrated by the following examples of preferred embodiments thereof. As used in the examples, the present conversion referred to is defined as $$\frac{\text{Moles of methyl methacrylate formed}}{\text{Moles of methyl isobutyrate fed}} \times 100$$

the percent yield referred to is defined as $$\frac{\text{Moles of methyl methacrylate formed}}{\text{Moles of methyl isobutyrate consumed}} \times 100$$

the gaseous hourly space velocity (GHSV) is defined as $$\frac{3600}{\text{Average contact time in seconds}}$$

and the liquid hourly space velocity (LHSV) is defined as the volume of liquid methyl isobutyrate fed into the reactor per volume of catalyst per hour.

EXAMPLE 1

A pelleted (⅛ inch) catalyst of activated alumina in the gamma form having a surface area of 80 square meters per gram was charged to a Vycor reactor, heated to 600° C. in a stream of nitrogen, and used as a catalyst for the dehydrogenation of methyl isobutyrate to methyl methacrylate. Methyl isobutyrate was passed over the alumina catalyst at 600° C., with a partial pressure of 50 mm. of mercury in nitrogen to a total pressure of 1 atmosphere, and an average contact time of 1 second (gaseous hourly space velocity was 3600). Various consecutive fractions or cuts of product were taken at various time intervals. The results of the dehydrogenation reaction are summarized by the data in Table 1 below, starting from the use of the fresh catalyst, in terms of percent conversion of methyl isobutyrate to methyl methacrylate and yield of methyl methacrylate.

Table 1

| Cut Length, Hours | Conversion, Percent | Yield, Percent |
| --- | --- | --- |
| 2 | 0 | 0 |
| 2 | 2.3 | 3.0 |
| 2 | 10.1 | 38.5 |
| 3 | 12.7 | 57.0 |
| 3 | 11.7 | 58.0 |

As noted from the data in Table 1, the alumina catalyst was destructive during the first two hours of use, no methyl methacrylate being produced. After about 4 hours of use the alumina catalyst began to pass through this initial wild period or induction period. Thereafter the alumina reached a state of substantially constant activity.

EXAMPLE 2

A second portion of the activated alumina described in Example 1 was water-extracted in a Soxhlet extractor until no more alkali was detected in the wash water. The principal contaminant in this alumina catalyst material was sodium oxide, and it decreased from 0.48% to 0.24% during the course of the washing. The washed alumina was calcined in air at 600° C., and then charged to a Vycor reactor. Gaseous methyl isobutyrate was passed over the alumina at 600° C. under a partial pressure of methyl isobutyrate of 50 mm. of mercury in nitrogen at a total pressure of 1 atmosphere and for an average contact time of 1 second. The alumina catalyst exhibited an initial period of destructiveness to the methyl isobutyrate, and thereafter settled down to give substantially constant conversions and yields after a 4 to 6 hour induction period. The removal of water-soluble alkali did not substantially change the conversion but did increase the yield over that obtained with the catalyst used in Example 1 which was not water-extracted. Reaction conditions were thereafter changed so that the methyl isobutyrate was passed over the same catalyst at 600° C. under a higher partial pressure of gaseous methyl isobutyrate of 380 mm. of mercury in nitrogen at a total pressure of 1 atmosphere and for an average contact time of 8 seconds. Thereafter, a water (steam) diluent was used instead of nitrogen under a partial pressure of methyl isobutyrate of 380 mm. of mercury at a total pressure of 1 atmosphere and at an average contact time of 8 seconds. An additional cut or fraction over the resulting alumina was taken by passing the gaseous methyl isobutyrate over the alumina at 600° C., under 760 mm. of mercury of partial pressure of methyl isobutyrate (no diluent), and at a contact time of 8 seconds. Table 2 below summarizes the results of varying the reaction conditions as described, starting from the use of the fresh catalyst in terms of percent conversion of methyl isobutyrate to methyl methacrylate and yield of methyl methacrylate.

Table 2

| $p_{MIB}$[1] | Contact Time, Sec. | Diluent | Cut Length, Hours | Conversion, Percent | Yield, Percent |
| --- | --- | --- | --- | --- | --- |
| 50 | 1 | N₂ | 2 | 0 | 0 |
| 50 | 1 | N₂ | 2 | 4.6 | 8.0 |
| 50 | 1 | N₂ | 2 | 10.8 | 44.3 |
| 50 | 1 | N₂ | 3 | 12.6 | 58.1 |
| 50 | 1 | N₂ | 3 | 11.9 | 61.0 |
| 50 | 1 | N₂ | 3 | 11.1 | 63.5 |
| 380 | 8 | N₂ | 1.5 | 17.8 | 47.5 |
| 380 | 8 | Steam | 1.5 | 16.4 | 45.6 |
| 760 | 8 | None | 1.5 | 15.7 | 34.7 |

[1] The partial pressure of the methyl isobutyrate in mm. of mercury in the indicated diluent gas at a total pressure of 1 atmosphere.

As can be observed from the data in Table 2, after the induction period, the alumina catalyst functioned effectively in the subject dehydrogenation process. Also to be noted is the fact that the subject dehydrogenation process can be efficiently carried out in the presence of substantial amounts of water (steam). In addition, the data in Table 2 points up the improved yields that result when partial pressures of gaseous methyl isobutyrate less than atmospheric pressure are employed.

EXAMPLE 3

A pelleted (⅛ inch) catalyst of activated alumina in the gamma form having a surface area of 180 square meters per gram was employed to dehydrogenate methyl isobutyrate to methyl methacrylate. The catalyst was derived from gel alumina and contained 2% graphite, the graphite having been used as a die lubricant in the pelleting of the alumina. The catalyst was charged to a Vycor reactor, heated to 600° C. and gaseous methyl isobutyrate passed over the catalyst at a partial pressure of 50 mm. of mercury in nitrogen to a total pressure of 1 atmosphere for an average contact time of 1 second. Several successive cuts or fractions of products were taken for 2 and then 3 hour intervals to determine the conversions and yields obtained as the catalyst passed through its induction period. The results of the dehydrogenation reaction are summarized by the data in Table 3 below, starting from the use of the fresh catalyst, in terms of percent conversion of methyl isobutyrate to methyl methacrylate and yield of methyl methacrylate.

Table 3

| Cut Length, Hours | Conversion, Percent | Yield, Percent |
| --- | --- | --- |
| 2 | 0 | 0 |
| 2 | 0 | 0 |
| 2 | 2.1 | 2.5 |
| 3 | 11.5 | 41.4 |
| 3 | 12.5 | 64.1 |
| 3 | 12.5 | 58.4 |
| 3 | 11.5 | 62.4 |

EXAMPLE 4

A pelleted (⅛ inch) catalyst of alpha-alumina monohydrate having a surface area of about 180–210 square meters per gram was employed to dehydrogenate methyl isobutyrate to methyl methacrylate. The catalyst was charged to a Vycor reactor and heated to 600° C., and thereafter gaseous methyl isobutyrate passed over the catalyst at a partial pressure of 50 mm. of mercury in nitrogen to a total pressure of 1 atmosphere for an average contact time of 1 second. Several successive cuts or fractions of product were taken for 2 and then 3 hour intervals to determine the conversions and yields obtained as the catalyst passed through its induction period. The results of the dehydrogenation period are summarized by the data in Table 4 below, starting from the use of the fresh catalyst, in terms of percent conversion of methyl isobutyrate to methyl methacrylate and yield of methyl methacrylate.

Table 4

| Cut Length, Hours | Conversion, Percent | Yield, Percent |
|---|---|---|
| 2 | 0 | 0 |
| 2 | 2.0 | 2.3 |
| 2 | 9.7 | 46.7 |
| 3 | 9.2 | 55.6 |
| 3 | 8.3 | 48.8 |

EXAMPLE 5

The activated alumina catalysts of the invention can be employed in combination with various metallic materials to reduce the initial wildness or induction period and to improve the conversions and yields in the subject dehydrogenation of methyl isobutyrate to methyl methacrylate. Typical of such promoters are vanadium oxides including vanadium dioxide, vanadium trioxide, vanadium tetroxide and vanadium pentoxide. A catalyst of gamma alumina containing 10% by weight of vanadium pentoxide ($V_2O_5$) in the form of 10 by 14 mesh particles having a surface area of about 170–180 square meters per gram was used to dehydrogenate methyl isobutyrate to methyl methacrylate under the conditions described in Example 1. For purposes of comparison, gamma alumina without a metallic promoter was used in the dehydrogenation reaction under the same conditions. The gamma alumina was in the form of 10 by 14 mesh particles having a surface area of 180 square meters per gram. Table 5 below summarizes data comparing the differences of conversions and yields resulting from the use of the gamma alumina catalyst alone and the gamma alumina catalyst promoted with vanadium pentoxide. Various consecutive fractions or cuts of product were taken for various time intervals, starting from the use of the fresh catalyst, in terms of percent conversion of methyl isobutyrate to methyl methacrylate and yield of methyl methacrylate.

Table 5

| Gamma Alumina | | | Gamma Alumina+$V_2O_5$ | | |
|---|---|---|---|---|---|
| Cut Length, Hours | Conversion, Percent | Yield, Percent | Cut Length, Hours | Conversion, Percent | Yield, Percent |
| 2.00 | 0 | 0 | 2.07 | 0 | 0 |
| 2.00 | 0 | 0 | 2.00 | 6.2 | 8.4 |
| 2.07 | 3.6 | 5.6 | 2.00 | 15.6 | 52.0 |
| 3.00 | 9.9 | 37.0 | 3.00 | 14.5 | 62.3 |
| 3.00 | 11.6 | 59.3 | 2.83 | 13.7 | 57.4 |
| 3.00 | 12.3 | 60.1 | 3.00 | 14.1 | 58.0 |
| 3.00 | 11.5 | 58.6 | 3.00 | 13.5 | 68.0 |

As can be observed from the data in Table 5, the vanadium pentoxide reduced the induction period of the gamma alumina and increased the conversion and yield in the subject reaction.

EXAMPLE 6

A catalyst of gamma alumina containing 10% by weight of vanadium pentoxide ($V_2O_5$) in ⅛ inch pellets having a surface area of 70 square meters per gram was used to dehydrogenate methyl isobutyrate to methyl methacrylate. The catalyst was charged to a Vycor reactor and the methyl isobutyrate passed over the catalyst for various contact times at 590° C. A vacuum was employed to reduce the partial pressure of the methyl isobutyrate reactant to 50 mm. of mercury. Several consecutive fractions or cuts of product were taken starting from the use of a freshly regenerated catalyst. The results of the dehydrogenation are summarized by the data set out in Table 6 below in terms of percent conversion of methyl isobutyrate to methyl methacrylate and percent yield of methyl methacrylate.

Table 6

| Contact Time, Sec. | L.H.S.V.[1] | Cut Length, Hours | Conversion, Percent | Yield, Percent |
|---|---|---|---|---|
| 0.5 | 0.77 | 1.00 | 3.1 | 3.8 |
| 0.5 | 0.77 | 0.92 | 14.5 | 55.5 |
| 0.5 | 0.77 | 1.00 | 18.0 | 66.7 |
| 1 | 0.38 | 1.02 | 12.2 | 42.9 |
| 1 | 0.38 | 1.05 | 16.9 | 38.5 |
| 1 | 0.38 | 0.98 | 10.3 | 50.4 |

[1] Liquid hourly space velocity as ml. per ml. of catalyst per hour.

EXAMPLE 7

A catalyst of gamma alumina having a surface area of 80 square meters per gram containing 10% by weight of vanadium trioxide ($V_2O_3$) was used to dehydrogenate methyl isobutyrate to methyl methacrylate. The catalyst was charged to a Vycor reactor and the methyl isobutyrate passed over the catalyst at 600° C. and at a liquid hourly space velocity of 0.26 ml. per ml. per hour, at a methyl isobutyrate partial pressure of 50 mm. of mercury in nitrogen to a total pressure of one atmosphere, and for an average contact time of 1.5 seconds. Two consecutive fractions or cuts of product were taken starting from the use of the fresh catalyst. The results of the dehydrogenation are summarized by the data set out in Table 7 below in terms of percent conversion of methyl isobutyrate to methyl methacrylate and percent yield of methyl methacrylate.

Table 7

| Cut Length, Hours | Conversion, Percent | Yield, Percent |
|---|---|---|
| 2.52 | 1.9 | 2.1 |
| 3.50 | 13.6 | 36.6 |

EXAMPLE 8

A vanadium oxide on alumina catalyst can be readily prepared. A portion of ⅛ inch pellets of Bayer process activated alumina having a surface area of 80 square meters per gram was impregnated with peroxyvanadic acid and calcined to produce a catalyst material which contained 20% vanadium pentoxide ($V_2O_5$). Gaseous methyl isobutyrate at 50 mm. of mercury partial pressure in admixture with nitrogen at one atmosphere total pressure was dehydrogenated over the resulting catalyst at 600° C., at a liquid hourly space velocity of 0.26 ml. per ml. of catalyst per hour and for a 1.5 second average contact time. Two consecutive fractions or cuts of product were taken starting from the use of the fresh catalyst. The results of the dehydrogenation are summarized by the data set out in Table 8 below in terms of percent conversion of methyl isobutyrate to methyl methacrylate and percent yield of methyl methacrylate.

Table 8

| Cut Length, Hours | Conversion, Percent | Yield, Percent |
|---|---|---|
| 3.62 | 6.0 | 8.2 |
| 2.45 | 13.8 | 39.1 |

EXAMPLE 9

Methyl isobutyrate was dehydrogenated to methyl methacrylate in the presence of a catalyst of gamma alumina containing 10% by weight of vanadium pentoxide ($V_2O_5$) in the form of 10 by 14 mesh particles having a surface area of about 170–180 square meters per gram. The dehydrogenation was effected in a Vycor reactor at 600° C., the partial pressure of the methyl isobutyrate was 50 mm. of mercury, and the average contact time was one second. A nitrogen diluent was used to a total pressure of one atmosphere for the first 6 hours of the reaction, and then varying mixtures of nitrogen and water (steam) diluent to a total pressure of one atmosphere were employed to illustrate the negligible effect of water on the reaction and the catalyst. Several consecutive fractions or cuts of product were taken starting from the use of the fresh catalyst. The results of the dehydrogenation are summarized by the data set out in Table 9 below in terms of percent conversion of methyl isobutyrate to methyl methacrylate and percent yield of methyl methacrylate.

Table 9

| Diluent | Cut Length, Hours | Conversion, Percent | Yield, Percent |
|---|---|---|---|
| $N_2$ | 2.03 | 0 | 0 |
| $N_2$ | 2.00 | 8.3 | 13.2 |
| $N_2$ | 2.00 | 16.0 | 57.7 |
| 190 mm. steam+520 mm. $N_2$ | 3.00 | 15.6 | 58.0 |
| 380 mm. steam+330 mm. $N_2$ | 3.00 | 13.6 | 59.9 |
| 570 mm. steam+140 mm. $N_2$ | 3.00 | 12.0 | 43.2 |
| 670 mm. steam+40 mm. $N_2$ | 3.00 | 11.3 | 64.3 |
| 670 mm. steam+40 mm. $N_2$ | 3.00 | 10.1 | 48.0 |
| 670 mm. steam+40 mm. $N_2$ | 3.00 | 10.1 | 55.1 |

EXAMPLE 10

Molybdenum oxides can also be employed to promote the alumina catalysts in the present dehydrogenation reaction. Typical molybdenum oxides include $MoO_2$, $MoO_3$, $Mo_2O_3$, $Mo_2O_5$ and the like. Preferred molybdenum oxides are molybdenum dioxide ($MoO_2$) and molybdenum trioxide ($MoO_3$). Often mixtures of one or more of such molybdenum oxides are used. Methyl isobutyrate was dehydrogenated to methyl methacrylate in the presence of gamma alumina (gel-type activated alumina) containing 10% by weight of molybdenum trioxide ($MoO_3$) in the form of ⅛ inch pellets having a surface area of about 170–180 square meters per gram. The dehydrogenation was effected in a Vycor reactor under varying temperatures and for varying average contact times. The methyl isobutyrate was under a reduced partial pressure in a nitrogen diluent to a total pressure of one atmosphere. Several consecutive fractions or cuts were taken. The results of the dehydrogenation are summarized by the data set out in Table 10 below, starting from the use of the fresh catalyst, in terms of percent conversion of methyl isobutyrate to methyl methacrylate and percent yield of methyl methacrylate.

Table 10

| Temp., °C. | $p_{MIB}$[1] | Contact Time, Sec. | Cut Length, Hours | Conversion, Percent | Yield, Percent |
|---|---|---|---|---|---|
| 587 | 86 | 0.95 | 4.00 | 1.8 | 2.8 |
| 587 | 86 | 0.95 | 1.57 | 6.9 | 37.8 |
| 619 | 72 | 1.03 | 2.10 | 13.2 | 37.5 |
| 603 | 47 | 0.69 | 2.10 | 9.6 | 61.4 |
| 585 | 81 | 1.40 | 2.45 | 10.0 | 50.9 |
| 608 | 98 | 1.23 | 1.83 | 11.9 | 41.1 |
| 607 | 83 | 0.97 | 1.70 | 9.9 | 50.4 |
| 593 | 37 | 1.01 | 3.90 | 10.0 | 58.2 |
| 595 | 107 | 0.53 | 0.72 | 5.0 | 72.9 |

[1] $p_{MIB}$ denotes the partial pressure of the methyl isobutyrate in mm. of mercury.

EXAMPLE 11

Methyl isobutyrate was dehydrogenated to methyl methacrylate in the presence of a catalyst of gamma alumina containing 9% by weight of molybdenum dioxide ($MoO_2$) in the form of ⅛ inch pellets having a surface area of about 80 square meters per gram. The dehydrogenation was effected in a Vycor reactor at 600° C., the partial pressure of the methyl isobutyrate was 50 mm. of mercury, the average contact time was .5 second and the liquid hourly space velocity was 0.74. A nitrogen diluent was used to a total pressure of one atmosphere. Several consecutive fractions or cuts were taken. The promoted alumina resulted in a substantially reduced induction period over the alumina base alone. The results of the dehydrogenation are summarized by the data set out in Table 11 below, starting from the use of the fresh catalyst, in terms of percent conversion of methyl isobutyrate to methyl methacrylate and percent yield of methyl methacrylate.

Table 11

| Cut Length, Hours | Conversion, Percent | Yield, Percent |
|---|---|---|
| 1.00 | 0 | 0 |
| 1.33 | 1.9 | 2.9 |
| 1.75 | 6.7 | 42.9 |
| 2.00 | 6.9 | 39.7 |
| 3.00 | 7.2 | 62.8 |

EXAMPLE 12

Methyl isobutyrate was dehydrogenated to methyl methacrylate in the presence of a catalyst of 10% by weight of molybdenum trioxide ($MoO_3$) supported on Bayer process activated alumina, the alumina consisting essentially of gamma alumina, alpha alumina monohydrate and chi alumina. The catalyst had a surface area of 80 square meters per gram and was in the form of ⅛ inch pellets. The dehydrogenation was effected in a Vycor reactor at 600° C., the partial pressure of the methyl isobutyrate was 50 mm. of mercury, the average contact time was .5 second and the liquid hourly space velocity was 0.74. A nitrogen diluent was used to a total pressure of one atmosphere. Several consecutive fractions or cuts were taken. The promoted alumina resulted in a substantially reduced induction period over the alumina base alone. The results of the dehydrogenation are summarized by the data set out in Table 12 below, starting from the use of fresh catalyst, in terms of percent conversion of methyl isobutyrate to methyl methacrylate and percent yield of methyl methacrylate.

Table 12

| Cut Length, Hours | Conversion, Percent | Yield, Percent |
|---|---|---|
| 1.00 | 0 | 0 |
| 1.83 | 4.7 | 17.8 |
| 2.12 | 5.5 | 38.2 |
| 2.23 | 5.4 | 36.3 |
| 7.18 | 5.4 | 43.6 |

EXAMPLE 13

Activated alumina containing a molybdenum oxide can be effectively employed to dehydrogenate methyl isobutyrate to methyl methacrylate in the presence of water. The dehydrogenation was effected in the presence of a catalyst composed of gamma alumina (gel-type) containing 10% by weight molybdenum trioxide ($MoO_3$) in the form of 10 by 14 mesh particles having a surface area of about 170–180 square meters per gram. The dehydrogenation was effected in a Vycor reactor at 600° C., the partial pressure of the methyl isobutyrate was 50 mm. of mercury and the average contact time was 1 second. A nitrogen diluent was used for several hours and then a water (steam) diluent was used to make the total pressure one atmosphere. Several consecutive fractions or cuts were taken. The promoted alumina resulted in a substantially reduced induction period over the alumina base alone. The results of the dehydrogenation are summarized by the data set out in Table 13 below, starting from the use of the fresh catalyst, in terms of percent conversion of methyl isobutyrate to methyl methacrylate and percent yield of methyl methacrylate.

Table 13

| Diluent | Cut Length, Hours | Conversion, Percent | Yield, Percent |
|---|---|---|---|
| N₂ | 2 | 0 | 0 |
| N₂ | 2 | 3.1 | 4.3 |
| N₂ | 2 | 13.2 | 41.2 |
| N₂ | 3 | 15.1 | 57.5 |
| N₂ | 3 | 15.5 | 67.2 |
| N₂ | 3 | 14.6 | 59.1 |
| Steam | 2 | 13.8 | 55.7 |

EXAMPLE 13a

For purposes of comparison, a catalyst of 10% by weight of molybdenum trioxide ($MoO_3$) on alpha alumina was used in the dehydrogenation of methyl isobutyrate, the alpha alumina not being an activated alumina. This catalyst was prepared by calcining diaspore (natural beta alumina monohydrate) in air at 560° C. for one hour to convert it to alpha alumina. This material was impregnated with aqueous ammonium heptamolybdate solution, dried, and calcined to convert the ammonium salt to molybdenum trioxide. Thirty-nine ml. of this catalyst as 4 by 10 mesh granules was charged to a Vycor reactor and heated at 600° C. in a stream of nitrogen. Methyl isobutyrate was fed to the reactor and the dehydrogenation effected at 600° C. under a methyl isobutyrate partial pressure of 50 mm. of mercury for an average contact time of .5 second. Nitrogen was used as a diluent gas to a total pressure of one atmosphere. Several consecutive fractions or cuts were taken. The results of the dehydrogenation are summarized by the data set out in Table 13a below, starting from the use of the fresh catalyst, in terms of percent conversion of methyl isobutyrate to methyl methacrylate and yield of methyl methacrylate.

Table 13a

| Cut Length, Hours | Conversion, Percent | Yield, Percent |
|---|---|---|
| 2 | 0.2 | 0.2 |
| 2 | 0.6 | 1.4 |
| 2 | 0.9 | 4.1 |

As can be seen from the data in Table 13a, molybdenum trioxide on alpha alumina is not an effective catalyst in the present dehydrogenation reaction. A pelleted catalyst consisting essentially of 10% molybdenum oxide on titania gel was also found to be relatively inactive at 600° C. in the dehydrogenation of methyl isobutyrate to methyl methacrylate.

EXAMPLE 14

A catalyst consisting essentially of gamma alumina and manganese dioxide ($MnO_2$) was prepared and employed in the present reaction. A 282 g. portion of a reagent grade solution of manganese nitrate containing 143 g. of manganese nitrate was diluted to 500 ml. with distilled water. A 225 g. portion of ⅛ inch pellets of Bayer process activated alumina having a surface area of 80 square meters per gram was placed in a stainless steel wire basket and the basket and its contents dipped into manganese nitrate solution. After 10 minutes the basket was lifted from the solution and the pellets were allowed to drain. The pellets were placed in a porcelain evaporating dish and dried on a hot plate. The dried pellets were again soaked in the manganese nitrate solution for 10 minutes and dried as before. The resulting pellets were then heated in an air muffle furnace for 1 hour and 20 minutes at 200° C. and 1 hour and 45 minutes at 400° C. The pellets were cooled in a desiccator and were found to be dark blue and metallic in appearance. A 50 gram portion of the pellets was charged to a Vycor reactor, heated in a stream of nitrogen and used as catalyst for the dehydrogenation of methyl isobutyrate to methyl methacrylate. Gaseous methyl isobutyrate was passed over the pelleted catalyst material at an elevated temperature under a reduced partial pressure in a nitrogen diluent to a total pressure of one atmosphere. Several consecutive fractions or cuts were taken. The promoted alumina resulted in a substantially reduced induction period over the alumina base alone. The results of the dehydrogenation are summarized by the data set out in Table 14 below, starting from the use of the fresh catalyst, in terms of percent conversion of methyl isobutyrate to methyl methacrylate and percent yield of methyl methacrylate.

Table 14

| Temp., °C. | $p_{MIB}$[1] | Contact Time, Sec. | Cut Length, Hours | Conversion, percent | Yield, percent |
|---|---|---|---|---|---|
| 590 | 100 | 0.5 | 2.00 | 0 | 0 |
| 590 | 100 | 1.0 | 1.03 | 3.3 | 6.3 |
| 590 | 50 | 0.5 | 1.03 | 3.4 | 36.7 |
| 600 | 100 | 0.5 | 0.52 | 2.4 | 41.1 |
| 600 | 50 | 1.0 | 1.03 | 5.7 | 61.6 |

[1] $p_{MIB}$ denotes the partial pressure of the methyl isobutyrate in mm. of mercury.

EXAMPLE 15

A catalyst consisting essentially of gamma alumina and manganese trioxide ($Mn_2O_3$) was prepared and employed in the present reaction. A 152 g. portion of Bayer process activated alumina in the form of ⅛ inch pellets and having a surface area of 80 square meters per gram was covered with a solution of 65.3 g. of manganese acetate tetrahydrate in 200 ml. of water. The water was evaporated from the resulting mixture and the pellets dried in a flow of air at 550° C. A volume of 27 ml. of the prepared catalyst was charged to a Vycor reactor and heated to 600° C. in a flow of nitrogen. A mixture in the ratio of 14.2 moles of nitrogen and one mole of methyl isobutyrate was passed over the catalyst at a temperature of 600° C., at a liquid hourly space velocity of 0.25 and for an average contact time of 1.5 seconds. Several consecutive fractions or cuts were taken. The promoted alumina resulted in a substantially reduced induction period over the alumina base alone. The results of the dehydrogenation are summarized by the data set out in Table 15 below, starting from the use of the fresh catalyst, in terms of percent conversion of methyl isobutyrate to methyl methacrylate and percent yield of methyl methacrylate.

Table 15

| Cut Length, Hours | Conversion, Percent | Yield, Percent |
|---|---|---|
| 3 | 5.7 | 7.6 |
| 3 | 10.5 | 42.3 |
| 2 | 11.3 | 37.6 |
| 3 | 7.4 | 24.9 |
| 3 | 8.6 | 45.5 |
| 2 | 12.0 | 66.3 |

EXAMPLE 16

Pellets of Bayer process activated alumina about ⅛ inch in size and having a surface area of 80 square meters per gram were dipped in magnesium acetate dissolved in aqueous actic acid, dried at 100° C. and dipped and dried twice more. The resulting pellets were then calcined in an air muffle furnace at 600° C. After this calcination the acetate had decomposed to yield a mixture of magnesium compounds which were predominantly the oxide and the carbonate on gamma alumina. The total magnesium present on the catalyst was equivalent to about 10% by weight magnesium oxide (MgO). Gaseous methyl isobutyrate was passed over the prepared pelleted catalyst material at 600° C., under a partial pressure of 50 mm. of mercury in nitrogen to a total pressure of one atmosphere and for an average contact time of .5 second. Successive 2 hour fractions or cuts of products were taken to determine the conversion of methyl isobutyrate to methyl methacrylate and the yield of methyl methacrylate. The promoted alumina resulted in a substantially reduced induction period over the alumina base alone. The results of the dehydrogenation reaction, starting from the use of the fresh catalyst, are summarized by the data in Table 16 below.

Table 16

| Cut Length, Hours | Conversion, Percent | Yield, Percent |
|---|---|---|
| 2 | 0.6 | 0.7 |
| 2 | 3.6 | 8.4 |
| 2 | 4.1 | 46.2 |

EXAMPLE 17

Ten percent calcium oxide (CaO) on gamma alumina catalyst material was prepared by dipping ⅛ inch pellets of Bayer process activated alumina having a surface area of 80 square meters per gram in aqueous calcium nitrate solution and drying the pellets at 100° C. This dipping and impregnation process was repeated for a total of 3 times and the resulting pellets were calcined in air at 600° C. to decompose the nitrate to the oxide (CaO). The resulting catalyst was charged to a Vycor reactor and tested for the dehydrogenation of methyl isobutyrate at 600° C., under 50 mm. of mercury of partial pressure of methyl isobutyrate in nitrogen at one atmosphere of total pressure, and for an average contact time of .5 second. It was found that the induction period was much less with the catalyst employed than with the gamma alumina catalyst containing no calcium oxide promoter, the yield increasing more rapidly with the present catalyst. The results of the dehydrogenation reaction, starting from the use of the fresh catalyst, are summarized by the data in Table 17 below wherein is described the conversions and yields of two consecutive 3 hour fractions.

Table 17

| Cut Length, Hours | Conversion, Percent | Yield, Percent |
|---|---|---|
| 3 | 5.9 | 15.0 |
| 3 | 5.5 | 36.1 |

EXAMPLE 18

A catalyst equivalent in calcium content to 10% by weight calcium oxide (CaO) was prepared by dipping ⅛ inch pellets of Bayer process activated alumina having a surface area of 80 square meters per gram in an aqueous calcium acetate solution, drying the pellets and then repeating the dipping and drying technique twice more. The catalyst was calcined at 600° C. in an air muffle furnace to decompose the acetate. The calcium was predominantly a mixture of calcium oxide and calcium carbonate, the calcium carbonate being converted to calcium oxide (CaO) during the course of the dehydrogenation reaction. When gaseous methyl isobutyrate was passed over the prepared pelleted catalyst material in a Vycor reactor at 600° C., under 50 mm. of mercury of partial pressure of methyl isobutyrate in nitrogen at a total pressure of one atmosphere, and for an average contact time of .5 second, the catalyst passed rapidly through an induction period, and then gave high conversions and yields of methyl methacrylate. The results of the dehydrogenation reaction in terms of conversion of methyl isobutyrate to methyl methacrylate and yields of methyl methacrylate of two consecutive 3 hour fractions are summarized by the data in Table 18 below starting from the use of the fresh catalyst.

Table 18

| Cut Length, Hours | Conversion, Percent | Yield, Percent |
|---|---|---|
| 3 | 5.0 | 9.7 |
| 3 | 8.1 | 53.5 |

EXAMPLE 19

A catalyst equivalent in calcium content to 2% by weight calcium oxide (CaO) was prepared by impregnating ⅛ inch pellets of Bayer process activated alumina having a surface area of 80 square meters per gram with calcium acetate dissolved in dilute aqueous acetic acid. The pellets were dried and calcined in air at 600° C. The calcium in the catalyst was in the form of a mixture of calcium oxide and calcium carbonate. Methyl isobutyrate was passed over the catalyst in a Vycor reactor at 600° C., under 50 mm. of mercury of partial pressure of methyl isobutyrate in nitrogen at a total pressure of one atmosphere and for an average contact time of 1 second. Comparison of the results obtained over gamma alumina alone as a catalyst under the same conditions employed indicated that the presence of the calcium compound resulted in significantly increased conversions and yields, as well as a significantly reduced induction period. The results of the dehydrogenation reaction in terms of conversion of methyl isobutyrate to methyl methacrylate and yields of methyl methacrylate for several successive cuts or fractions are summarized by the data in Table 19 below starting from the use of the fresh catalyst.

Table 19

| Cut Length, Hours | Conversion, Percent | Yield, Percent |
|---|---|---|
| 2 | 0 | 0 |
| 2 | 12.8 | 35.3 |
| 2 | 15.2 | 54.0 |
| 3 | 14.2 | 56.4 |
| 3 | 15.8 | 60.0 |

EXAMPLE 20

A catalyst containing an equivalent of 1% by weight calcium oxide (CaO) was prepared by impregnating ⅛ inch pellets of Bayer process activated alumina having a surface area of 80 square meters per gram with a solution of calcium acetate dissolved in dilute aqueous acetic acid. The impregnated pellets were then dried and calcined at 600° C. in air until the acetate in the mixture was converted predominantly to calcium oxide and calcium carbonate. The resulting pelleted catalyst material was charged to a Vycor reactor and used to dehydrogenate methyl isobutyrate to methyl methacrylate at a temperature of 600° C., under 50 mm. of mercury of partial pressure of methyl isobutyrate in nitrogen at one atmosphere of total pressure and for an average contact time of one second. The catalyst rapidly passed through an induction period and gave high conversions to methyl methacrylate with high yields. The results of the dehydrogenation reaction in terms of percent conversion of methyl isobutyrate to methyl methacrylate and percent yield of methyl methacrylate are summarized by the data set out in Table 20 below starting from the use of the fresh catalyst.

Table 20

| Cut Length, Hours | Conversion, Percent | Yield, Percent |
|---|---|---|
| 2 | 0 | 0 |
| 2 | 4.8 | 12.5 |
| 2 | 11.7 | 62.6 |
| 3 | 13.4 | 64.6 |
| 3 | 11.7 | 71.1 |

EXAMPLE 21

A catalyst equivalent in strontium content to 10% by weight of strontium oxide (SrO) was prepared by impregnating ⅛ inch pellets of Bayer process activated alumina having a surface area of 80 square meters per gram with a solution of strontium acetate in dilute aqueous acetic acid. The impregnated pellets were dried and calcined at 600° C. to decompose the acetate to a mixture of predominantly strontium oxide and strontium carbonate on gamma alumina. The resulting pelleted catalyst material was used to dehydrogenate methyl isobutyrate in a Vycor reactor at 600° C., under 50 mm. of mercury of partial pressure of methyl isobutyrate in nitrogen to one atmosphere of total pressure, and for an average contact time of .5 second. Three consecutive 2 hour cuts or fractions were taken. The promoted alumina had a substantially reduced induction period as compared to the alumina base alone. The results of the dehydrogenation reaction are summarized by the data set out in Table 21 below in terms of conversion of methyl isobutyrate to methyl methacrylate and yields of methyl methacrylate starting from the use of the fresh catalyst.

Table 21

| Cut Length, Hours | Conversion, Percent | Yield, Percent |
|---|---|---|
| 2 | 4.7 | 8.4 |
| 2 | 7.9 | 38.4 |
| 2 | 7.6 | 52.4 |

EXAMPLE 22

A catalyst equivalent in barium content to 10% by weight barium oxide (BaO) was prepared by impregnating ⅛ inch pellets of Bayer process activated alumina having a surface area of 80 square meters per gram with a solution of barium acetate dissolved in dilute aqueous acetic acid. The preparation was dried and calcined in air at 600° C. to decompose the acetate to a mixture composed predominantly of barium oxide and barium carbonate. The resulting pelleted catalyst material was employed in a Vycor reactor to dehydrogenate methyl isobutyrate at 600° C., under 50 mm. of mercury of partial pressure of methyl isobutyrate in nitrogen at one atmosphere of total pressure, and for an average contact time of .5 second. The catalyst material passed through an induction period and gave about 7% conversion of methyl methacrylate and about 37% yield of methyl methacrylate. Such results are a marked improvement over the gamma alumina base tested under these same conditions. After 4.2 hours the dehydrogenation temperature was lowered to 590° C. and the average contact time was raised to one second and a fraction or cut was taken for the next 2 hour period. The results of the dehydrogenation reaction in terms of percent conversion of methyl isobutyrate to methyl methacrylate and yield of methyl methacrylate are summarized by the data set out in Table 22 below starting from the use of the fresh catalyst.

Table 22

| Contact Time, Sec. | Cut Length, Hours | Conversion, Percent | Yield, Percent |
|---|---|---|---|
| .5 | 2.0 | 3.6 | 6.6 |
| .5 | 2.2 | 7.0 | 36.5 |
| 1.0 | 2.0 | 7.3 | 51.8 |

EXAMPLE 23

A catalyst composed of 10% by weight titanium dioxide ($TiO_2$) on gamma alumina was prepared by impregnating ⅛ inch pellets of Bayer process activated alumina having a surface area of 80 square meters per gram with a solution of titanium lactate in dilute aqueous lactic acid. The pellets were dried and calcined in air at 600° C. to decompose the lactate to the oxide. The resulting catalyst material was employed to dehydrogenate methyl isobutyrate in a Vycor reactor at 600° C., under a 50 mm. of mercury of partial pressure of methyl isobutyrate in nitrogen at one atmosphere of total pressure, and for an average contact time of .5 second. The presence of the titanium dioxide caused a marked improvement in conversion and yield over the gamma alumina base tested under the same conditions. The results of the dehydrogenation reaction are summarized in terms of conversion of methyl isobutyrate to methyl methacrylate and yield of methyl methacrylate by the data in Table 23 below starting from the use of the fresh catalyst.

Table 23

| Cut Length, Hours | Conversion, Percent | Yield, Percent |
|---|---|---|
| 3.0 | 2.9 | 5.5 |
| 3.3 | 5.0 | 29.6 |

EXAMPLE 24

A catalyst composed of 10% by weight zirconium dioxide ($ZrO_2$) on gamma alumina was prepared by impregnating ⅛ inch pellets of Bayer process activated alumina having a surface area of 80 square meters per gram with zirconyl acetate solution. The impregnated pellets were dried and calcined in a muffle furnace in air at 600° C. to decompose the zirconyl acetate to zirconium dioxide. The resulting pelleted catalyst was then employed in a Vycor reactor to dehydrogenate methyl isobutyrate at 600° C., under 50 mm. of mercury of partial pressure of methyl isobutyrate in nitrogen at one atmosphere of total pressure, and for an average contact time of .5 second. The activity and selectivity of the zirconium dioxide on gamma alumina surpassed that of the gamma alumina base tested under the same conditions. Three consecutive fractions or cuts of product were taken and analyzed. The results of the dehydrogenation reaction in terms of conversion of methyl isobutyrate to methyl methacrylate and yield of methyl methacrylate are summerized by the data set out in Table 24 below starting from the first use of the fresh catalyst.

Table 24

| Cut Length, Hours | Conversion, Percent | Yield, Percent |
|---|---|---|
| 3 | 4.0 | 8.2 |
| 3 | 6.0 | 38.8 |

EXAMPLE 25

A catalyst composed of 10.5% by weight niobium pentoxide ($Nb_2O_5$) on gamma alumina was prepared by impregnating ⅛ inch pellets of Bayer process activated alumina having a surface area of 80 square meters per gram with a solution of niobium (V) acid oxalate in dilute oxalic acid. The resulting impregnated pellets were dried and calcined in air at 600° C. to convert the niobium acid oxalate essentially to niobium pentoxide. The resulting catalyst was charged to a Vycor reactor and employed to dehydrogenate methyl isobutyrate at 600° C., under 50 mm. of mercury of partial pressure of methyl isobutyrate in nitrogen at one atmosphere of total pressure, and for an average contact time of .5 second. The tested catalyst showed a marked improvement over the gamma alumina base under the same conditions with respect to improved yield and reduced induction period. It is probable that under the reaction conditions at least part of the niobium pentoxide was reduced to lower oxides which were also catalytically useful in the present dehydrogenation reaction. The results of the dehydrogenation reaction, starting from the first use of the fresh catalyst, are summarized in terms of percent conversion of methyl isobutyrate to methyl methacrylate and percent yield of methyl methacrylate by the data set out in Table 25 below.

Table 25

| Cut Length, Hours | Conversion, Percent | Yield, Percent |
|---|---|---|
| 2 | 0.4 | 0.5 |
| 2 | 3.9 | 20.6 |
| 2 | 4.3 | 75.3 |

EXAMPLE 26

A commercial preparation of 20% by weight chromium trioxide ($Cr_2O_3$) on ⅛ inch pellets of Bayer process activated alumina having a surface area of 80 square meters per gram was charged to a Vycor reactor and employed in the dehydrogenation of methyl isobutyrate at 600° C., under 50 mm. of mercury of partial pressure of methyl isobutyrate in nitrogen at one atmosphere of total pressure, and for an average contact time of one second. The catalyst passed through an induction period and gave higher conversions and yields as compared to a catalyst consisting of the gamma alumina alone. The results of the dehydrogenation reaction, starting from the use of the fresh catalyst, are summarized in terms of percent conversion of methyl isobutyrate to methyl methacrylate and percent yield of methyl methacrylate by the data set out in Table 26 below.

Table 26

| Cut Length, Hours | Conversion, Percent | Yield, Percent |
|---|---|---|
| 2 | 4.2 | 5.6 |
| 2 | 11.9 | 58.6 |
| 2 | 11.7 | 60.1 |
| 3 | 11.1 | 59.2 |
| 3 | 10.3 | 64.9 |

EXAMPLE 27

A commercial catalyst composed of 0.45% palladium (Pd) on gamma alumina having a surface area of about 80 square meters per gram in the form of ⅛ inch pellets was employed as a catalyst in the dehydrogenation of methyl isobutyrate. The methyl isobutyrate was passed over the catalyst at 600° C., under 50 mm. of mercury of partial pressure of methyl isobutyrate in nitrogen at one atmosphere of total pressure, and for an average contact time of .5 second. Three consecutive 2 hour fractions or cuts of product were taken. The promoted alumina had a substantially reduced induction period as compared to the alumina base alone. The results of the dehydrogenation reaction, starting from the use of the fresh catalyst, are summarized in terms of percent conversion of methyl isobutyrate to methyl methacrylate and percent yield of methyl methacrylate by the data set out in Table 27 below.

Table 27

| Cut Length, Hours | Conversion, Percent | Yield, Percent |
|---|---|---|
| 2 | 1.4 | 1.7 |
| 2 | 4.5 | 21.3 |
| 2 | 5.1 | 46.4 |

EXAMPLE 28

A catalyst composed of 12% by weight cupric oxide (CuO) on gamma alumina was prepared by impregnating ⅛ inch pellets of Bayer process activated alumina having a surface area of 80 square meters per gram with an aqueous solution of cupric nitrate. The resulting impregnated pellets were dried and calcined at 500° C. to decompose the nitrate to an oxide. The resulting pelleted catalyst material was employed to dehydrogenate methyl isobutyrate in a Vycor reactor. The methyl isobutyrate was passed over the catalyst at 600° C., under 50 mm. of mercury of partial pressure of methyl isobutyrate in nitrogen at a total pressure of one atmosphere, and for an average contact time of .5 second. Several consecutive fractions or cuts of product were taken at various time intervals. The promoted alumina had a substantially reduced induction period as compared to the alumina base alone. The results of the dehydrogenation reaction, starting from the use of the fresh catalyst, are summarized in terms of percent conversion of methyl isobutyrate to methyl methacrylate and percent yield of methyl methacrylate by the data set out in Table 28 below.

Table 28

| Cut Length, Hours | Conversion, Percent | Yield, Percent |
|---|---|---|
| 2 | 2.8 | 5.5 |
| 2 | 4.7 | 28.8 |
| 2 | 4.4 | 41.2 |

EXAMPLE 29

A catalyst composed of 10% by weight silver (Ag) on gamma alumina was prepared by impregnating ⅛ inch pellets of Bayer process activated alumina having a surface area of 80 square meters per gram with an aqueous silver nitrate solution. The resulting impregnated pellets were calcined and dried in air at 600° C. to decompose the silver nitrate to elemental silver. The resulting pelleted catalyst was used to dehydrogenate methyl isobutyrate in a Vycor reactor at a temperature 600° C., under 50 mm. of mercury of partial pressure of methyl isobutyrate in nitrogen at one atmosphere of total pressure, and for an average contact time of one second. Compared with the gamma alumina base tested under the same conditions, the presence of silver greatly reduced the initial period of wildness, giving high yields and conversions much earlier in the life of the catalyst than those obtained with the gamma alumina base. Three consecutive 2 hour cuts and a 3.7 hour cut of product were taken. The results of the dehydrogenation reaction, starting from the use of the fresh catalyst, are summarized in terms of percent conversion of methyl isobutyrate and percent yield of methyl methacrylate by the data set out in Table 29 below.

Table 29

| Cut Length, Hours | Conversion, Percent | Yield, Percent |
|---|---|---|
| 2 | 1.4 | 1.8 |
| 2 | 9.9 | 36.1 |
| 2 | 11.6 | 60.2 |
| 3.7 | 11.3 | 55.4 |

EXAMPLE 30

A catalyst composed of 10% by weight of zinc oxide (ZnO) on gamma alumina was prepared by impregnating ⅛ inch pellets of Bayer process activated alumina having a surface area of 80 square meters per gram with an aqueous zinc acetate solution. The resulting impregnated pellets were dried and calcined in air at 600° C. to decompose the acetate to oxide. The resulting pelleted catalyst was employed to dehydrogenate methyl isobutyrate in a Vycor reactor at 600° C., under 50 mm. of mercury of partial pressure of methyl isobutyrate in nitrogen at one atmosphere of total pressure, and for an average contact time of .5 second. The addition of the zinc oxide to the gamma alumina decreased the length and severity of the induction period of the gamma alumina. The conversion and yield with the zinc oxide promoter were superior to those obtained with the gamma alumina base tested under the same reaction conditions. Three successive 2 hour fractions or cuts of product were taken. The results of the dehydrogenation reaction are summarized in terms of percent conversion of methyl isobutyrate to methyl methacrylate and percent yield of methyl methacrylate by the data set out in Table 30 below.

Table 30

| Cut Length, Hours | Conversion, Percent | Yield, Percent |
| --- | --- | --- |
| 2 | 3.2 | 5.7 |
| 2 | 6.6 | 35.1 |
| 2 | 6.9 | 56.4 |

EXAMPLE 31

A commercial catalyst composed of 10% by weight cadmium oxide (CdO) on gamma alumina having a surface area of about 80 square meters per gram in the form of 1/8 inch pellets was used in the dehydrogenation of methyl isobutyrate. The methyl isobutyrate was passed over the catalyst in a Vycor reactor at 600° C., under 50 mm. of mercury of partial pressure of methyl isobutyrate in nitrogen at one atmosphere of total pressure, and for an average contact time of one second. During the dehydrogenation there was appreciable reduction of the cadmium oxide to cadmium metal, the catalyst thus being a mixture of cadmium oxide and cadmium metal. Compared with the gamma alumina base tested under the same conditions, the cadmium oxide-cadmium metal promoter markedly decreased the induction period. In addition, the cadmium oxide-cadmium metal improved the yield of methyl methacrylate substantially over the yields obtained with the gamma alumina base. Several consecutive fractions or cuts of product were taken at various time intervals during the dehydrogenation reaction. The results of the dehydrogenation reaction, starting from the use of the fresh catalyst, are summarized in terms of percent conversion of methyl isobutyrate to methyl methacrylate and percent yield of methyl methacrylate by the data set out in Table 31 below.

Table 31

| Cut Length, Hours | Conversion, Percent | Yield, Percent |
| --- | --- | --- |
| 2 | 0.3 | 0.3 |
| 2 | 7.4 | 24.0 |
| 2 | 8.1 | 56.7 |
| 3 | 10.8 | 67.8 |
| 3 | 9.3 | 66.6 |

EXAMPLE 32

A catalyst composed of 10% by weight lead oxide (PbO) on gamma alumina was prepared by impregnating 1/8 inch pellets of Bayer process activated alumina having a surface area of 80 square meters per gram with a lead acetate solution. The resulting impregnated pellets were dried and calcined at 600° C. in air to convert the acetate to oxide. The resulting pelleted catalyst was used to dehydrogenate methyl isobutyrate in a Vycor reactor at 600° C., under 50 mm. of mercury of partial pressure of methyl isobutyrate in nitrogen at one atmosphere of total pressure, and for an average contact time of one second. After a shortened induction period the catalyst showed an increased yield over that exhibited by unpromoted gamma alumina. Several successive fractions or cuts of product were taken at various time intervals. The results of the dehydrogenation reaction are summarized in terms of percent conversion of methyl isobutyrate to methyl methacrylate and percent yield of methyl methacrylate by the data set out in Table 32 below starting from the use of the fresh catalyst.

Table 32

| Cut Length, Hours | Conversion, Percent | Yield, Percent |
| --- | --- | --- |
| 2 | 1.5 | 1.7 |
| 2 | 12.1 | 45.0 |
| 3 | 11.5 | 55.7 |
| 3 | 10.7 | 61.8 |
| 2 | 10.5 | 60.3 |

EXAMPLE 33

A catalyst composed of 5% by weight of antimony oxide ($Sb_2O_4$) on gamma alumina was prepared by impregnating 214 g. of 1/8 inch pellets of Bayer process activated alumina having a surface area of 80 square meters per gram with a solution prepared by dissolving 20 grams of sulfur in 200 ml. of aqueous ammonium sulfide solution and then dissolving 10.2 g. of antimony oxide ($Sb_2O_3$) therein. The resulting mixture was evaporated to dryness and then calcined slowly at a temperature raised to 500° C. to burn off the sulfur and convert the antimony sulfide on the alumina to antimony oxide ($Sb_2O_4$). The prepared pelleted catalyst was used to dehydrogenate methyl isobutyrate in a Vycor reactor at an elevated temperature under 50 mm. of mercury of partial pressure of methyl isobutyrate in nitrogen to a total pressure of one atmosphere. Several successive fractions or cuts were taken at various time intervals. The promoted alumina resulted in a substantially reduced induction period over the alumina base alone. The results of the dehydrogenation reaction are summarized in terms of percent conversion of methyl isobutyrate to methyl methacrylate and percent yield of methyl methacrylate by the data set out in Table 33 below starting from the use of the fresh catalyst.

Table 33

| Temp., ° C | Cut Length, Hours | Contact Time, Sec. | Conversion, Percent | Yield, Percent |
| --- | --- | --- | --- | --- |
| 600 | 2.00 | 1 | 0 | 0 |
| 600 | 2.00 | 1 | 4.3 | 7.7 |
| 600 | 1.88 | 1 | 9.8 | 43.9 |
| 600 | 3.00 | 1 | 11.3 | 63.6 |
| 600 | 3.00 | 1 | 10.7 | 67.9 |
| 550 | 2.00 | 2 | 7.2 | 53.0 |
| 600 | 2.00 | 2 | 10.2 | 62.2 |
| 630 | 2.00 | 1 | 17.1 | 55.2 |

EXAMPLE 34

A commercial catalyst composed of bismuth trioxide ($Bi_2O_3$) on 1/8 inch pellets of gamma alumina having a surface area of about 80 square meters per gram was employed to dehydrogenate methyl isobutyrate. The bismuth trioxide was present in the catalyst at a level of 11.5% by weight calculated as bismuth. The catalyst was charged to a Vycor reactor and methyl isobutyrate at a partial pressure of 50 mm. of mercury diluted with nitrogen to a total pressure of one atmosphere, at a temperature of 600° C., and for an average contact time of one second was passed over the catalyst. Several successive fractions or cuts were collected and analyzed. The bismuth trioxide in the catalyst was reduced in part to bismuth metal and bismuth monoxide during the course of the reaction. The promoted alumina used had a substantially reduced induction period over the alumina base alone. The results of the dehydrogenation reaction are summarized in terms of percent conversion of methyl isobutyrate to methyl methacrylate and percent yield of methyl methacrylate by the data set out in Table 34 below starting from the use of the fresh catalyst.

Table 34

| Out Length, Hours | Conversion, Percent | Yield, Percent |
|---|---|---|
| 2 | 0 | 0 |
| 2 | 3.8 | 6.6 |
| 2 | 7.8 | 46.2 |
| 3 | 9.9 | 68.2 |
| 3 | 8.8 | 67.1 |

EXAMPLE 35

A catalyst composed of 5% lithium oxide ($Li_2O$) on gamma alumina was prepared by impregnating ⅛ inch pellets of Bayer process activated alumina having a surface area of 80 square meters per gram with a dilute aqueous acetic acid solution of lithium acetate. The resulting impregnated pellets were then calcined in air in a muffle furnace at 600° C. to decompose the acetate salt to an oxide. The prepared pelleted catalyst was used to dehydrogenate methyl isobutyrate in a Vycor reactor at 600° C., under 50 mm. of mercury of partial pressure of methyl isobutyrate in nitrogen to a total pressure of one atmosphere, and for an average contact time of one second. Several successive fractions or cuts were taken and the product analyzed. The presence of the lithium promoter markedly decreased the induction or wildness period of the alumina base. The results of the dehydrogenation reaction are summarized in terms of percent conversion of methyl isobutyrate to methyl methacrylate and percent yield of methyl methacrylate by the data set out in Table 35 below starting from the use of the fresh catalyst.

Table 35

| Out Length, Hours | Conversion, Percent | Yield, Percent |
|---|---|---|
| 2 | 2.1 | 2.7 |
| 2 | 10.4 | 37.4 |
| 2 | 10.7 | 40.1 |
| 3 | 10.4 | 47.4 |
| 3 | 9.4 | 53.3 |

EXAMPLE 36

A catalyst was prepared by impregnating ⅛ inch pellets of Bayer process activated alumina having a surface area of 80 square meters per gram with an aqueous cerium nitrate solution. The impregnated pellets were dried and calcined at 600° C. to decompose the nitrate to cerium oxide. This catalyst was equivalent in cerium content to 10% by weight of $CeO_2$. A 100 ml. portion of the prepared catalyst was used to dehydrogenate methyl isobutyrate in a Vycor reactor at an elevated temperature under a methyl isobutyrate partial pressure of 50 mm. of mercury. Nitrogen was used as a diluent gas to make the total pressure one atmosphere. Several successive fractions or cuts were taken and the products analyzed. The promoted alumina employed had a substantially reduced induction period over the alumina base alone. The results of the dehydrogenation reaction are summarized in terms of percent conversion of methyl isobutyrate to methyl methacrylate and percent yield of methyl methacrylate by the data set out in Table 36 below starting from the use of the fresh catalyst.

Table 36

| Temp., ° C. | Contact Time, Sec. | Out Length, Hours | Conversion, Percent | Yield, Percent |
|---|---|---|---|---|
| 600 | 1 | 2 | 0.1 | 0.1 |
| 600 | 1 | 2 | 5.1 | 10.9 |
| 600 | 1 | 2 | 8.8 | 50.8 |
| 600 | 1 | 3 | 10.1 | 62.0 |
| 600 | 1 | 3 | 8.8 | 63.0 |
| 550 | 2 | 2 | 6.1 | 48.9 |
| 600 | 2 | 2 | 16.5 | 48.4 |
| 630 | 1 | 2 | 14.5 | 51.7 |

EXAMPLE 37

A commercial catalyst composed of 10% by weight of tungsten trioxide ($WO_3$) on gamma alumina having a surface area of about 180 square meters per gram in the form of 10 x 14 mesh particles was used in the dehydrogenation of methyl isobutyrate. The dehydrogenation was esected in a Vycor reactor at a temperature of 600° C., under a methyl isobutyrate partial pressure of 50 mm. of mercury diluted with nitrogen to a total pressure of one atmosphere, and for an average contact time of one second. Several successive cuts or fractions were collected and analyzed during the reaction. After a reduced induction period, the tungsten oxide-promoted alumina catalyst gave particularly high yields of methyl methacrylate. The results of the dehydrogenation reaction are summarized in terms of percent conversion of methyl isobutyrate to methyl methacrylate and yield of methyl methacrylate by the data set out in Table 37 below starting from the use of the fresh catalyst.

Table 37

| Cut Length, Hours | Conversion, Percent | Yield, Percent |
|---|---|---|
| 2 | 0 | 0 |
| 2 | 4.4 | 7.7 |
| 2 | 8.0 | 54.0 |
| 3 | 8.8 | 59.8 |
| 3 | 8.7 | 76.1 |

EXAMPLE 38

Several metal oxides were found to be ineffective or detrimental in combination with activated alumina as catalysts for dehydrogenating methyl isobutyrate. While such promoters as compounds of the alkaline earth metals and the alkali metal, lithium are effective as promoters for activated alumina, compounds of such closely related alkali metals as sodium and potassium are not effective promoters in the present reaction. In addition, we have found that thallium, boron, iron and cobalt oxides are not effective promoters. The results of the dehydrogenation of methyl isobutyrate in the presence of several metal moieties on gamma alumina having a surface area of 80 square meters per gram in the form of ⅛ inch pellets are summarized in Table 38 below in terms of percent conversion of methyl isobutyrate to methyl methacrylate and percent yield of methacrylate starting from the use of the fresh catalyst. Several successive fractions or cuts were collected and analyzed for each catalyst material. The catalysts were prepared by impregnating the gamma alumina with a promoter starting material and thereafter calcining the impregnated gamma alumina at about 600° C. A methyl isobutyrate partial pressure of 50 mm. of mercury was employed in each instance, the methyl isobutyrate having been diluted with nitrogen to a total pressure of one atmosphere.

As can be seen from the data set out in Table 38, there are several metal moieties that are not only ineffective as promoters of the activated alumina catalysts in the present process, but they are of substantially less utility in combination with activated alumina than is activated alumina alone in the present process.

As used in the above examples, the mesh size referred to is the U.S. Standard Sieve Series. The Bayer process activated alumina referred to in the above examples consisted essentially of gamma alumina and was alluded to as gamma alumina. However, the Bayer process activated alumina also contained minor amounts of other activated aluminas including alpha alumina monohydrate and chi alumina. The gel-type activated alumina referred to in the above examples consisted essentially of alpha alumina monohydrate, which on calcination is converted to gamma alumina.

As described hereinabove, we have found a new catalyst that is specific in the dehydrogenation of methyl Table 38

| Catalyst | Promoter Starting Compound | Temp., °C. | Contact Time Sec. | Cut Length, Hour | Conversion, Percent | Yield Percent |
|---|---|---|---|---|---|---|
| (a) 10% B₂O₃ on Gamma Alumina | H₃BO₃ | 600<br>600<br>600 | 1<br>1<br>1 | 2<br>2<br>2 | 0<br>0<br>0 | 0<br>0<br>0 |
| (b) Na₂CO₃+Na₂O on Gamma Alumina (equiv. to 10% Na₂O) | NaOCCH₃ (with O double bond) | 600<br>600<br>600 | .5<br>.5<br>.5 | 4<br>2.5<br>2.5 | 0.3<br>0.6<br>0.1 | 0.4<br>1.5<br>0.1 |
| (c) 10% K₂O on Gamma Alumina | KNO₃ | 600 | .5 | 2.6 | 0.5 | 1.0 |
| (d) 10% CoO on Gamma Alumina | Co(OCCH₃)₂ (with O double bond) | 550<br>600 | 1<br>1 | (¹)<br>2.00 | 0<br>0.1 | 0<br>0.1 |
| (e) 10% Tl₂O on Gamma Alumina | TlNO₃ | 600<br>600<br>600<br>600 | 1<br>1<br>1<br>1 | 1.05<br>1.17<br>3.00 | 0.9<br>1.4 | 1.4<br>3.1 |
| (f) 20% Fe₂O₃ on Gamma Alumina (Commercial catalyst) | | 600 | 1 | (²) | 0 | 0 |

¹ After 8 minutes' use the catalyst bed was plugged with heavy deposits of carbonaceous materials and was not useable.
² After 62 minutes' use the catalyst bed was plugged with heavy deposits of carbonaceous material and was not useable.

isobutyrate to methyl methacrylate. The use of the present catalyst results in relative high conversions and yields in the present dehydrogenation reaction. The methyl isobutyrate starting material is convenient to use as it can be easily prepared from readily available isobutyraldehyde by well-known methods. Further, the solid activated alumina catalyst material used in our process, apart from being highly specific to the subject dehydrogenation reaction, is relatively inexpensive to use on a commercial scale as it has a long life, it can be readily recovered after completion of the process, and it can be easily regenerated to the desired activity after extended periods of use. Thus, the present process provides a commercially useful method for preparing methyl methacrylate from methyl isobutyrate.

Although the invention has been described in detail with respect to certain preferred embodiments thereof, it is to be understood that variations and modifications can be effected within the spirit and scope of the invention as described hereinabove and as defined by the appended claims.

This application is a continuation-in-part of our copending application U.S. Serial No. 683,951, filed September 16, 1957, now abandoned.

We claim:

1. The process which comprises heating methyl isobutyrate in the vapor phase at a temperature of 400°–800° C. in the presence of a catalyst comprising an activated alumina and dehydrogenating a substantial amount of said methyl isobutyrate to methyl methacrylate.

2. The process according to claim 1 wherein the activated alumina is gamma alumina.

3. The process according to claim 1 wherein the activated alumina is alpha alumina monohydrate.

4. The process which comprises heating methyl isobutyrate in the vapor phase at a temperature of 400°–800° C. at a partial pressure of less than atmospheric pressure in admixture with an inert gas in the presence of a catalyst comprising an activated alumina and dehydrogenating a substantial amount of said methyl isobutyrate to methyl methacrylate.

5. The process according to claim 4 wherein the inert gas is nitrogen.

6. The process according to claim 4 wherein the inert gas is steam.

7. The process which comprises heating methyl isobutyrate in the vapor phase at a temperature of 400°–800° C. at a pressure of less than one atmosphere in the presence of a catalyst comprising an activated alumina and dehydrogenating a substantial amount of said methyl isobutyrate to methyl methacrylate.

8. The process which comprises introducing methyl isobutyrate into a reaction zone at a temperature of 500°–650° C. and containing a catalyst comprising an activated alumina; contacting said methyl isobutyrate with said catalyst for an average time of .5–5 seconds, the pressure of the methyl isobutyrate being 1–500 mm. of mercury; and dehydrogenating a substantial amount of said methyl isobutyrate to methyl methacrylate.

9. The process according to claim 8 wherein the activated alumina is gamma alumina.

10. The process according to claim 8 wherein the activated alumina is alpha alumina monohydrate.

11. The process which comprises heating methyl isobutyrate in the vapor phase at a temperature of 400°–800° C. in the presence of a catalyst comprising an activated alumina base and a promoter comprising a metal selected from the group consisting of vanadium, molybdenum, magnesium, calcium, strontium, barium, titanium, zirconium, niobium, chromium, palladium, copper, silver, zinc, cadmium, lead, manganese, antimony, bismuth, lithium, cerium and tungsten, and dehydrogenating a substantial amount of said methyl isobutyrate to methyl methacrylate.

12. The process which comprises introducing methyl isobutyrate into a reaction zone at a temperature of 400°–800° C. and containing a catalyst comprising a vanadium oxide on an activated alumina, the vanadium oxide being .1–30% of the combined weight of the vanadium oxide and the activated alumina; contacting said methyl isobutyrate with said catalyst for an average time of .05–10 seconds, the pressure of the methyl isobutyrate being less than atmospheric pressure; and dehydrogenating a substantial amount of said methyl isobutyrate to methyl methacrylate.

13. The process which comprises introducing methyl isobutyrate into a reaction zone at a temperature of 400°–800° C. and containing a catalyst comprising a molybdenum oxide on an activated alumina, the molybdenum oxide being .1–30% of the combined weight of the molybdenum oxide and the activated alumina; contacting said methyl isobutyrate with said catalyst for an average time of .05–10 seconds, the pressure of the methyl isobutyrate being less than atmospheric pressure; and dehydrogenating a substantial amount of said methyl isobutyrate to methyl methacrylate.

14. The process which comprises introducing methyl isobutyrate into a reaction zone at a temperature of 400°–800° C. and containing a catalyst comprising an alkaline earth metal oxide on an activated alumina, the alkaline earth metal oxide being .1–30% of the combined weight of the alkaline earth metal oxide and the activated alumina; contacting said methyl isobutyrate with said catalyst for an average time of .05–10 seconds, the pressure of the methyl isobutyrate being less than atmospheric pressure; and dehydrogenating a substantial amount of said methyl isobutyrate to methyl methacrylate.

15. The process which comprises introducing methyl isobutyrate into a reaction zone at a temperature of 500°–650° C. and containing a catalyst comprising vanadium trioxide having the formula $V_2O_3$ on gamma alumina having a surface area of 50–250 square meters per gram, the vanadium trioxide being 1–15% of the combined weight of the vanadium trioxide and the gamma alumina; contacting said methyl isobutyrate with said catalyst for an average time of .5–5 seconds, the pressure of the methyl isobutyrate being 25–250 mm. of mercury; and dehydrogenating a substantial amount of said methyl isobutyrate to methyl methacrylate.

16. The process which comprises introducing methyl isobutyrate into a reaction zone at a temperature of 500°–650° C. and containing a catalyst comprising vanadium pentoxide having the formula $V_2O_5$ on gamma alumina having a surface area of 50–250 square meters per gram, the vanadium pentoxide being 1–15% of the combined weight of the vanadium pentoxide and the gamma alumina; contacting said methyl isobutyrate with said catalyst for an average time of .5–5 seconds, the pressure of the methyl isobutyrate being 25–250 mm. of mercury; and dehydrogenating a substantial amount of said methyl isobutyrate to methyl methacrylate.

17. The process which comprises introducing methyl isobutyrate into a reaction zone at a temperature of 500°–650° C. and containing a catalyst comprising molybdenum dioxide having the formula $MoO_2$ on gamma alumina having a surface area of 50–250 square meters per gram, the molybdenum dioxide being 1–15% of the combined weight of the moylbdenum dioxide and the gamma alumina; contacting said methyl isobutyrate with said catalyst for an average time of .5–5 seconds, the pressure of the methyl isobutyrate being 25–250 mm. of mercury; and dehydrogenating a substantial amount of said methyl isobutyrate to methyl methacrylate.

18. The process which comprises introducing methyl isobutyrate into a reaction zone at a temperature of 500°–650° C. and containing a catalyst comprising molybdenum trioxide having the formula $MoO_3$ on gamma alumina having a surface area of 50–250 square meters per gram, the molybdenum trioxide being 1–15% of the combined weight of the molybdenum trioxide and the gamma alumina; contacting said methyl isobutyrate with said catalyst for an average time of .5–5 seconds, the pressure of the methyl isobutyrate being 25–250 mm. of mercury; and dehydrogenating a substantial amount of said methyl isobutyrate to methyl methacrylate.

19. The process which comprises introducing methyl isobutyrate into a reaction zone at a temperature of 500°–650° C. and containing a catalyst comprising calcium oxide having the formula CaO on gamma alumina having a surface area of 50–250 square meters per gram, the calcium oxide being 1–15% of the combined weight of the calcium oxide and the gamma alumina; contacting said methyl isobutyrate with said catalyst for an average time of .5–5 seconds, the pressure of the methyl isobutyrate being 25–250 mm. of mercury; and dehydrogenating a substantial amount of said methyl isobutyrate to methyl methacrylate.

No references cited.